(12) United States Patent
Natsuga

(10) Patent No.: US 12,172,648 B1
(45) Date of Patent: Dec. 24, 2024

(54) VEHICLE THAT EXECUTES A DOWNSHIFT DELAY PROCESS

(71) Applicant: TOYOTA JIDOSHA KABUSHIKI KAISHA, Toyota (JP)

(72) Inventor: Yuji Natsuga, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/650,908

(22) Filed: Apr. 30, 2024

(30) Foreign Application Priority Data

Jun. 19, 2023 (JP) ................................. 2023-099914

(51) Int. Cl.
- *B60W 30/19* (2012.01)
- *B60W 10/06* (2006.01)
- *B60W 10/10* (2012.01)
- *B60W 30/18* (2012.01)

(52) U.S. Cl.
CPC ............ *B60W 30/19* (2013.01); *B60W 10/06* (2013.01); *B60W 10/10* (2013.01); *B60W 30/18163* (2013.01); *B60W 2552/53* (2020.02)

(58) Field of Classification Search
CPC .............. B60W 10/06; B60W 10/10; B60W 30/18163; B60W 30/19; B60W 30/14; B60W 30/16; B60W 2552/53
See application file for complete search history.

(56) References Cited

U.S. PATENT DOCUMENTS

| | | | |
|---|---|---|---|
| 2010/0292048 A1* | 11/2010 | Oshima | B60W 10/06 477/109 |
| 2014/0038774 A1* | 2/2014 | Kida | B60W 10/184 477/96 |
| 2017/0051825 A1* | 2/2017 | Jeon | F16H 61/0213 |

FOREIGN PATENT DOCUMENTS

| | | |
|---|---|---|
| JP | 2001-254641 A | 9/2001 |
| JP | 2007-232108 A | 9/2007 |
| JP | 2023-027997 A | 3/2023 |

* cited by examiner

*Primary Examiner* — Edwin A Young
(74) *Attorney, Agent, or Firm* — Oliff PLC

(57) ABSTRACT

The vehicle includes a drive source, a transmission that shifts power from the drive source and transmits the power to the drive wheels, and a control device that controls the drive source and the transmission. The control device executes a downshift delay process of changing the timing of the downshift of the transmission to the low vehicle speed side as compared with the case where the predetermined condition is not satisfied when the predetermined condition is not satisfied, when the subject vehicle is in the following mode that follows the forward vehicle, the overtaking with respect to the forward vehicle is restricted, and the predetermined condition of the accelerator off and the brake off is satisfied.

4 Claims, 4 Drawing Sheets

VEHICLE THAT EXECUTES A DOWNSHIFT DELAY PROCESS

CROSS-REFERENCE TO RELATED APPLICATION

This application claims priority to Japanese Patent Application No. 2023-099914 filed on Jun. 19, 2023, incorporated herein by reference in its entirety.

BACKGROUND

1. Technical Field

The present disclosure relates to a vehicle.

2. Description of Related Art

Conventionally, there has been proposed a vehicle including a drive device that outputs a drive force for travel and a brake device that applies a braking force to the vehicle (see Japanese Unexamined Patent Application Publication No. 2023-27997 (JP 2023-27997 A), for example). In this vehicle, cruise control is executed using modes including a single cruise mode in which the drive device is controlled such that the host vehicle travels at a set speed when there is no vehicle ahead within a first predetermined distance, a following cruise mode in which the drive device and the brake device are controlled such that the host vehicle follows a vehicle ahead with the inter-vehicle distance from the vehicle ahead being a second predetermined distance or more within the range of the set speed when there is a vehicle ahead within the first predetermined distance, and a stop transition mode in which the drive device and the brake device are controlled such that the host vehicle is stopped with the inter-vehicle distance from the vehicle ahead being a third predetermined distance when the vehicle ahead is expected to be stopped. During travel in the stop transition mode, a driver is notified of an expected stop position of the host vehicle when the speed of the host vehicle is higher than the speed of the vehicle ahead, and the driver is not notified of the expected stop position of the host vehicle when the speed of the host vehicle is lower than the speed of the vehicle ahead.

SUMMARY

In a vehicle including a drive source and a transmission that transmits power from the drive source to drive wheels while changing the speed of the power, there is a possibility that the drivability is deteriorated if a relatively large change occurs in deceleration acceleration (deceleration G) due to a relatively large change in the rotational speed of the drive source caused by a downshift of the transmission that accompanies deceleration of the vehicle when the host vehicle is in a following mode in which the host vehicle follows a vehicle ahead, overtaking of the vehicle ahead is restricted, and an accelerator is off and a brake is off.

A main object of the vehicle according to the present disclosure is to suppress deterioration of drivability.

The vehicle according to the present disclosure adopts the following means in order to achieve the above-described main object.

An aspect of the present disclosure provides a vehicle including:
a drive source;
a transmission that transmits power from the drive source to drive wheels while changing a speed of the power; and
a control device that controls the drive source and the transmission, in which
the control device is configured to execute a downshift delay process of changing a timing of a downshift of the transmission to a low vehicle speed side when a host vehicle is in a following mode in which the host vehicle follows a vehicle ahead, overtaking of the vehicle ahead is restricted, and a predetermined condition that an accelerator is off and a brake is off is met, as compared with when the predetermined condition is not met.

The vehicle according to the present disclosure executes a downshift delay process of changing a timing of a downshift of the transmission to a low vehicle speed side when the host vehicle is in a following mode in which the host vehicle follows a vehicle ahead, overtaking of the vehicle ahead is restricted, and a predetermined condition that an accelerator is off and a brake is off is met, as compared with when the predetermined condition is not met. Accordingly, the downshift of the transmission can be delayed, and thus a change in the rotational speed of the drive source at the time when the downshift of the transmission is performed can be suppressed, and a change in the deceleration acceleration (deceleration G) of the host vehicle can be suppressed. As a result, deterioration in drivability can be suppressed.

In the vehicle according to the aspect of the present disclosure, the control device may be configured to determine that overtaking of the vehicle ahead is restricted when the host vehicle is traveling on a road with one lane in each direction or when a surrounding vehicle is present within a predetermined distance in right and left lanes from the host vehicle.

In the vehicle according to the aspect of the present disclosure, the control device may be configured to change a shifting line of the transmission at a time when the accelerator is off and the brake is off to a low vehicle speed side as the downshift delay process.

The control device may also be configured to perform a downshift of the transmission when the rotational speed of the drive source reaches a predetermined rotational speed or less as the downshift delay process.

In the vehicle according to the aspect of the present disclosure, the control device may be configured to increase torque of the drive source, when the vehicle ahead has broken away and a request to accelerate the host vehicle has been made during execution of the downshift delay process, so as to compensate for at least a part of a shortage of torque output to the drive wheels when the downshift delay process is executed with respect to torque output to the drive wheels when the downshift delay process is not executed.

In this manner, it is possible to compensate for at least a part of the shortage of the torque output to the drive wheels during the execution of the downshift delay process. As a result, it is possible to suppress insufficient acceleration of the host vehicle during the execution of the downshift delay process, and to suppress the driver feeling slowness or the like.

In this case, the control device may terminate the downshift delay process after changing the shift speed of the transmission when the vehicle ahead has broken away and a request to accelerate the host vehicle is being made during the execution of the downshift delay process.

In the vehicle according to the present disclosure, the control device may terminate the downshift delay process when a request to accelerate the host vehicle is not made for a predetermined time after the vehicle ahead breaks away during the execution of the downshift delay process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
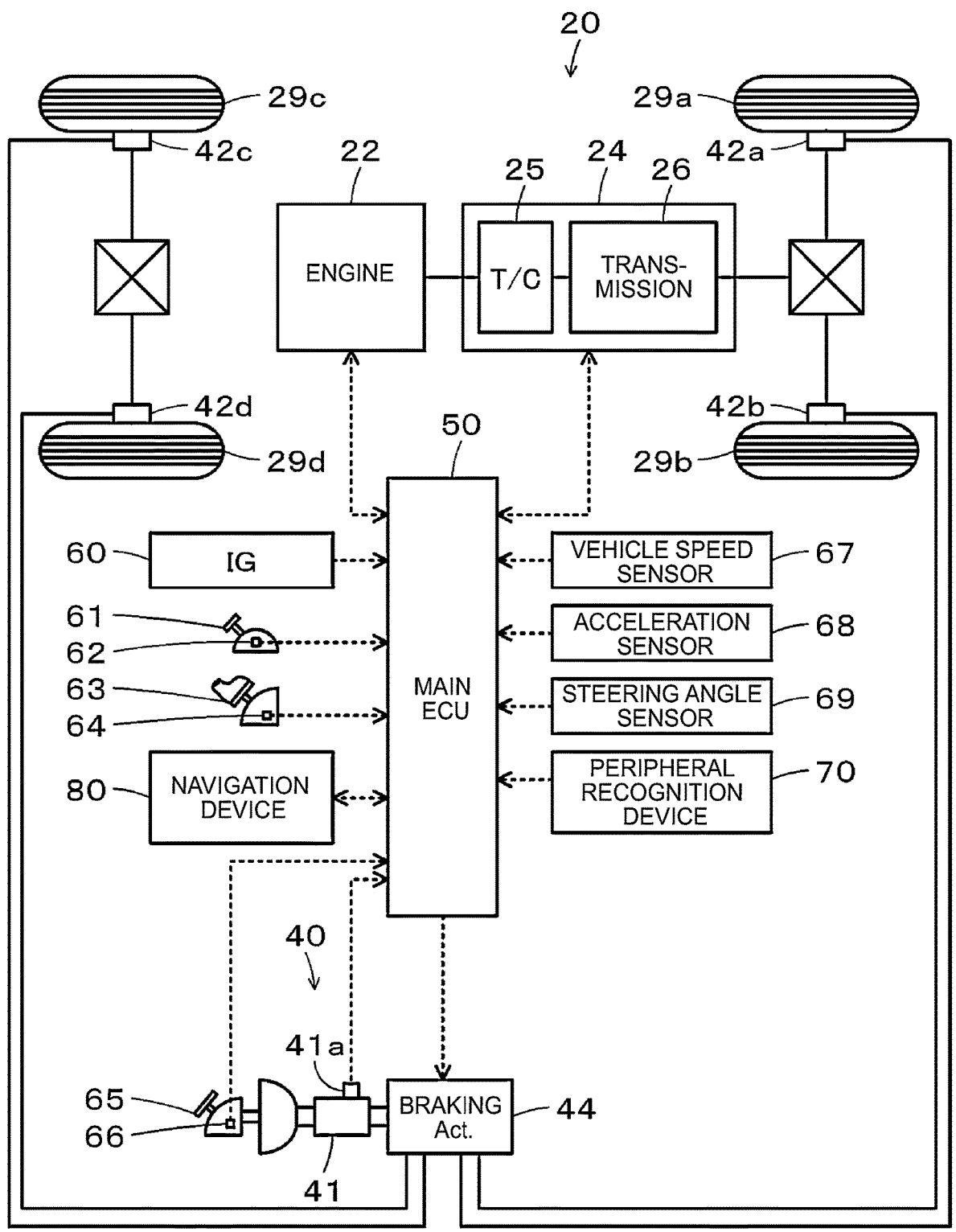
FIG. 1 is a schematic configuration diagram of a vehicle 20 according to the present embodiment.

Embodiments of the present disclosure will be described with reference to the drawings. FIG. 1 is a schematic configuration diagram of a vehicle 20 according to the present embodiment. As illustrated, the vehicle 20 of the present embodiment includes an engine 22 as a drive source, a power transmission device 24, a brake device 40, a navigation device 80, and a main electronic control unit (hereinafter referred to as a "main ECU") 50.

The engine 22 is configured as a multi-cylinder internal combustion engine that outputs power using gasoline, light oil, or the like as fuel. An output shaft (crankshaft) of the engine 22 is connected to the torque converter 25 of the power transmission device 24.

The power transmission device 24 includes a torque converter 25 and a transmission 26. The torque converter 25 is configured as a general fluid transmission device, and includes a pump impeller connected to an output shaft of the engine 22, a turbine runner connected to an input shaft of the transmission 26, a stator that rectifies a flow of hydraulic oil from the turbine runner to the pump impeller, a one-way clutch that restricts a rotation direction of the stator in one direction, and a hydraulically-driven lock-up clutch that connects and disconnects the pump impeller and the turbine runner. The torque converter 25 transmits the power of the output shaft of the engine 22 to the input shaft of the transmission 26 with or without torque amplification. The transmission 26 is configured as a stepped transmission with a five-stage transmission, and includes an input shaft, an output shaft, a plurality of planetary gears, and a plurality of friction engagement elements (clutches and brakes) for hydraulic driving. An input shaft of the transmission 26 is connected to the torque converter 25. An output shaft of the transmission 26 is connected to the drive wheel 29a, 29b via a differential gear and an axle. The transmission 26 forms a plurality of forward stages and a plurality of reverse stages by disengaging the plurality of friction engagement elements.

The brake device 40 is configured as a hydraulic-driven brake device, and includes a master cylinder 41, a plurality of brake pads 42a to 42d, a plurality of brake wheel cylinders, and a brake actuator 44. The master cylinder 41 is pressurized by depression of the brake pedal 65. 42d from the plurality of brake pads 42a are respectively attached to the drive wheels 29a, 29b and the driven wheels 29c, 29d. The plurality of brake wheel cylinders respectively drives the plurality of brake pads 42a to 42d. The brake actuator 44 is configured to adjust the hydraulic pressures of the plurality of brake wheel cylinders to apply a braking force to the drive wheel 29a, 29b and the driven wheel 29c, 29d. For example, the brake actuator 44 adjusts the hydraulic pressure of the plurality of brake wheel cylinders so that the braking force based on the pressure (master cylinder pressure Pm) of the master cylinder 41 generated in response to the depression of the brake pedal 65 acts on the drive wheel 29a, 29b and the driven wheel 29c, 29d, or adjusts the hydraulic pressure of the plurality of brake wheel cylinders so that the braking force required for the brake device 40 acts on the drive wheel 29a, 29b and the driven wheel 29c, 29d, regardless of the depression of the brake pedal 65, for example, when the host vehicle approaches the front vehicle.

The navigation device 80 includes a main body having a built-in control unit, a GPS, and a display. The control unit includes a storage medium (for example, a hard disk, a SSD, or the like), an input/output port, and a communication port in which map information and the like are stored. In the map information, service information (for example, tourist information, a parking lot, and the like), road information in each traveling section (for example, between traffic lights, between intersections, and the like) and the like are stored as a database. The road information includes distance information, road width information, information on the number of lanes, area information (urban areas and suburbs), road type information (general roads and highways), slope information, legal speed, the number of traffic lights, a turning radius of each curve, and the like. GPS detects the position of the host vehicle based on the signals transmitted from the plurality of GPS satellites. The display is configured as a touch panel type display that displays various kinds of information such as a current position of the own vehicle and a traveling route to a destination, and allows a user to input various kinds of instructions. When the display is operated by the user and the destination is set, the navigation device 80 sets a travel route to the destination based on the map information stored in the storage medium, the present position of the host vehicle detected by GPS, and the set destination, and displays the set travel route on the display to perform route guidance. The navigation device 80 communicates with the main ECU 50.

The main ECU 50 includes a microcomputer, and the microcomputer includes a CPU, a ROM, RAM, a flash memory, an input/output port, and a communication port. The main ECU 50 receives signals from various sensors. The signal inputted to the main ECU 50 may be, for example, a signal related to the condition of the engine 22 from a plurality of sensors such as the crank angle θcr of the crankshaft of the engine 22 from the crank angle sensor. Signals related to the status of the power transmission device 24 from a plurality of sensors, such as an input-shaft of the transmission 26 from the rotational-speed sensor and a rotational-speed Nin, Nout of the output-shaft, can also be cited. A master cylinder pressure Pm, which is the pressure of the master cylinder 41 from the pressure sensor 41a, may also be mentioned. An ignition signal from the ignition switch 60 and a shift position SP that is an operating position of the shift lever 61 from the shift position sensor 62 can also be mentioned. An accelerator operation amount Acc which is a depression amount of the accelerator pedal 63 from the accelerator pedal position sensor 64 and a brake pedal position BP which is a depression amount of the brake pedal 65 from the brake pedal position sensor 66 can also be exemplified. The vehicle speed V from the vehicle speed sensor 67, the front-rear acceleration Gx and the lateral acceleration Gy which are the acceleration in the front-rear direction and the left-right direction of the host vehicle from the acceleration sensor 68, and the steering angle θw from the steering angle sensor 69 can also be exemplified. Information about the host vehicle and its surroundings from the peripheral recognition device 70, for example, an inter-vehicle distance and a relative speed between the host vehicle and the front vehicle, an inter-vehicle distance and a relative speed between the host vehicle and the rear vehicle, and a distance between the host vehicle and a side (including the left and right front) vehicle can also be cited. The peripheral recognition device 70 includes at least a part of a camera, a millimeter-wave radar, a quasi-millimeter-wave radar, an infrared laser radar, a sonar, and the like.

The main ECU 50 outputs various control signals. Examples of the signal outputted from the main ECU 50 include a control signal to the engine 22, a control signal to the power transmission device 24, and a control signal to the brake actuator 44. The main ECU 50 calculates the rotational speed Ne of the engine 22 based on the crank angle θcr from the crank angle sensor. The main ECU 50 communicates with the navigation device 80. The main ECU 50 performs brake control of the driving support system, for example, collision damage reduction brake control.

Figure 2:
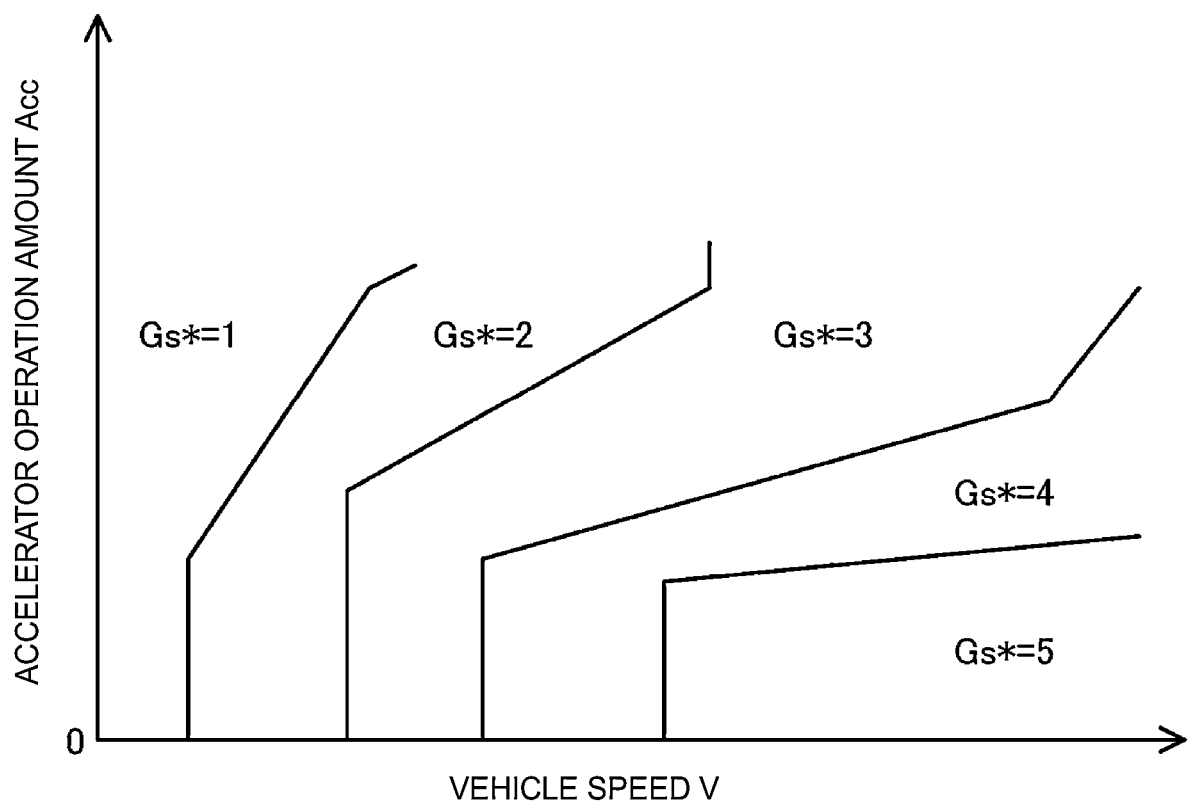
FIG. 2 is an explanatory diagram illustrating an example of a shift diagram.

In the vehicle 20 of the present embodiment, the main ECU 50 sets the target gear stage Gs* of the transmission 26 on the basis of the accelerator operation amount Acc, the vehicle speed V, and the shift diagram, and controls the transmission 26 so that the gear stage Gs of the transmission 26 becomes the target gear stage Gs*. Further, the main ECU 50 sets a target torque Te* of the engine 22 based on the accelerator operation amount Acc, the vehicle speed V, and the gear stage Gs of the transmission 26, and controls the engine 22 so that the engine 22 is operated based on the target torque Te*. FIG. 2 is an explanatory diagram illustrating an example of a shift diagram. In the example of FIG. 2, for simplicity, the shift line (upshift line) for upshift of the transmission 26 and the shift line (downshift line) for downshift are the same. The upshift line and the downshift line may be different from each other.

Figure 3:
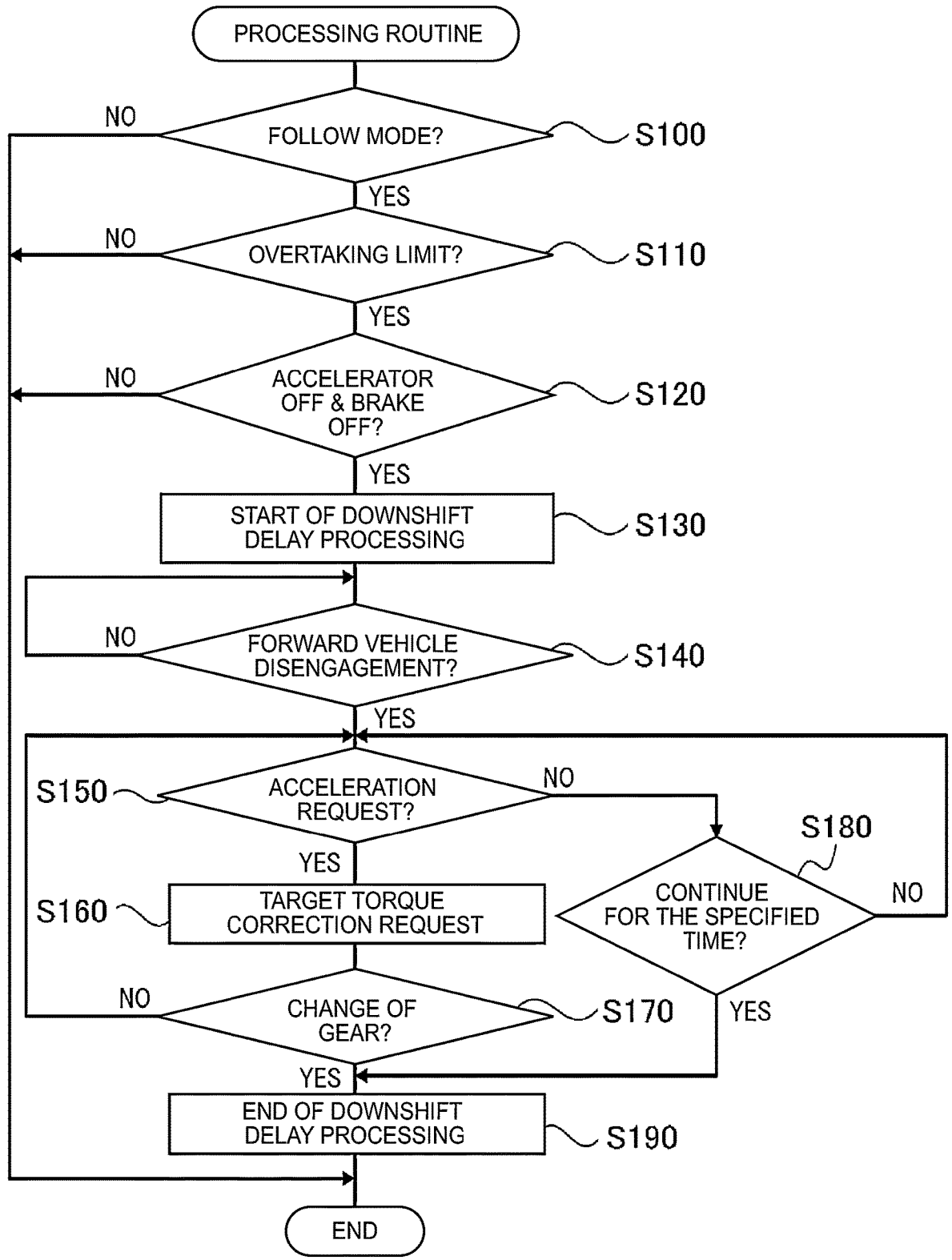
FIG. 3 is a flow chart illustrating an exemplary process routine.

Next, the operation of the vehicle 20 of the present embodiment will be described. FIG. 3 is a flow chart illustrating an example of a process routine executed by the main ECU 50. This routine is executed repeatedly.

When the process routine of FIG. 3 is executed, the main ECU 50 determines whether or not the own vehicle is in the following mode that follows the front vehicle (S100), determines whether or not the overtaking restriction condition for which the overtaking with respect to the front vehicle is restricted is satisfied (S110), and determines whether or not the vehicle is accelerator-off and brake-off (S120).

Here, the determination process of whether or not the vehicle is in the following mode can be performed by using information from the peripheral recognition device 70, for example, the inter-vehicle distance between the host vehicle and the front vehicle, the relative speed, and the like. For example, when the front vehicle is present within a predetermined distance LI in front of the host vehicle, it is determined that the vehicle is in the following mode. The predetermined distance LI may be a constant value, or may be set based on a relative velocity between the host vehicle and the front vehicle.

As the overtaking restriction condition, an OR condition of the number of lanes, which is one lane on one side, and a lateral vehicle condition in which the surrounding vehicle is present within a predetermined distance of the left and right lanes with respect to the host vehicle is used. The determination process of whether or not the lane number condition is satisfied can be performed using information from the navigation device 80, for example, the current position of the own vehicle and road information (lane number information). The determination process of whether or not the lateral vehicle condition is satisfied can be performed by using information from the peripheral recognition device 70, for example, a distance between the host vehicle and the side (including the left and right front) vehicle.

The determination process of whether or not the accelerator is off and the brake is off can be performed using the accelerator operation amount Acc from the accelerator pedal position sensor 64 and the brake pedal position BP from the brake pedal position sensor 66.

When it is determined in S100 that the vehicle is not in the following mode, or when it is determined in S110 that the overtaking restriction condition is not satisfied (neither the lane number condition nor the side vehicle condition is satisfied), and when it is determined in S120 that the vehicle is accelerator-on or brake-on, the routine ends.

When it is determined that the vehicle is in the following mode in S100 and the overtaking restriction condition is satisfied in S110 (the lane number condition or the side vehicle condition is satisfied), and it is determined that the vehicle is accelerator-off and brake-off in S120, the downshift delay process is started (S130).

Figure 4:
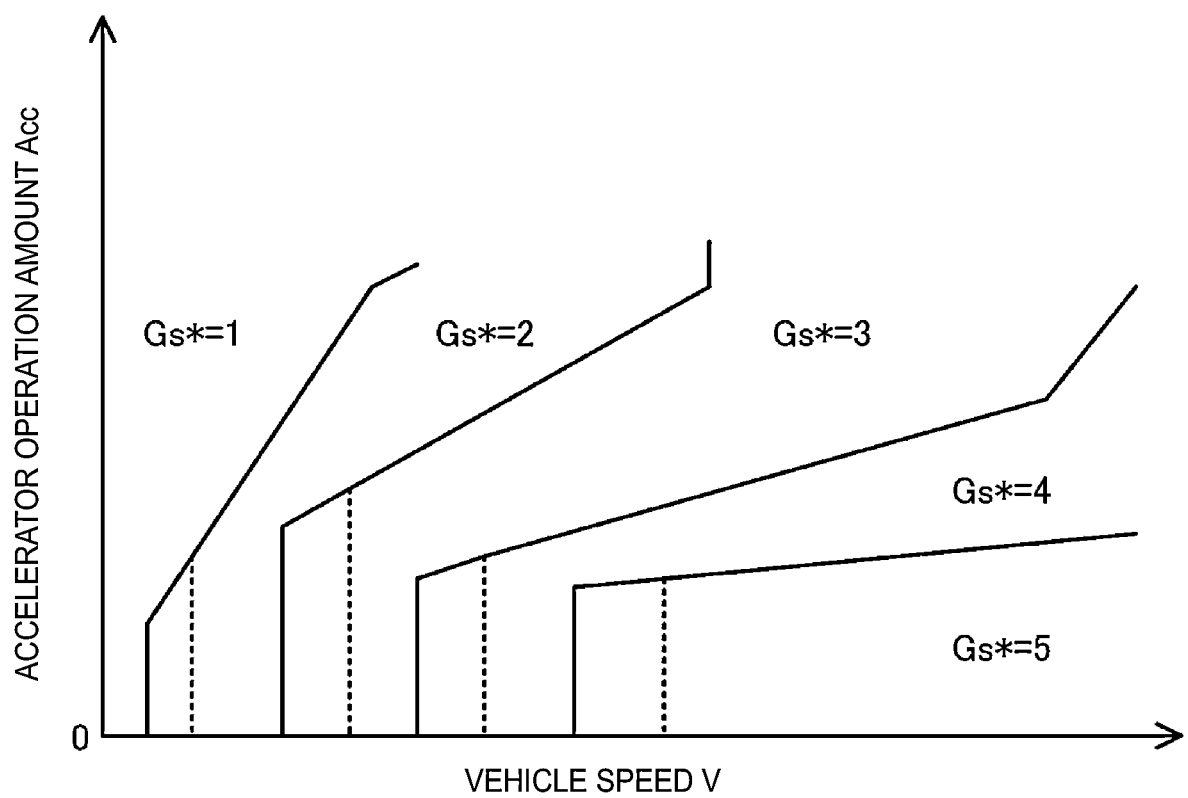
FIG. 4 is a diagram illustrating an exemplary shift diagram for a downshift delay process.

Here, in the downshift delay process, the shift diagram is changed from the normal shift diagram to the shift diagram for the downshift delay process. FIG. 4 is an explanatory diagram illustrating an example of a shift diagram for a downshift delay process. In FIG. 4, for comparison, a shift diagram (the same as in FIG. 2) in a normal state is illustrated by a dotted line. In the shift diagram for the downshift delay process, the shift line of the transmission 26 at the time of accelerator-off and brake-off is changed to the low-vehicle speed side as compared with the normal shift diagram. Considering the case of the accelerator-off state and the brake-off state, by delaying the downshift of the transmission 26 by the downshift delay process, it is possible to suppress the change in the rotational speed of the engine 22 and the torque converter 25 when the downshift of the transmission 26 is performed, and to suppress the change in the deceleration acceleration (deceleration G) of the host vehicle. As a result, deterioration in drivability can be suppressed. In some cases, the downshift of the transmission 26 itself can be suppressed. Incidentally, it is also possible to suppress the occurrence of inconvenience due to a large change in the deceleration G when the brake control of the driving support system, for example, the collision damage reduction brake control, is performed.

When the downshift delay process is started in this way, it is determined whether or not the front vehicle has been disengaged (S140), and when it is determined that the front vehicle has not been disengaged, it waits for the front vehicle to be disengaged. Here, the process of determining whether or not the front vehicle is disengaged can be performed by using information from the peripheral recognition device 70, for example, the inter-vehicle distance between the host vehicle and the front vehicle, the relative speed, and the like. For example, it is determined that the front vehicle is disengaged when the front vehicle does not exist within a predetermined distance in front of the host vehicle by accelerating the front vehicle or changing the traveling lane, or when the front vehicle does not exist within a predetermined distance in front of the host vehicle by changing the traveling lane.

If it is determined in S140 that the front vehicle has left, it is determined whether or not an acceleration demand for the host vehicle is being made (S150). This determination process can be performed by determining whether or not the accelerator operation amount Acc from the accelerator pedal position sensor 64 is equal to or greater than the threshold Aref.

When it is determined that the acceleration request of the host vehicle is being made in S150, a correction request for the target torque Te* of the engine 22 is made (S160). When the downshift delay process is performed, the downshift of the transmission 26 is delayed (suppressed) compared to when the downshift delay process is not performed. For this reason, when the downshift delay process is being performed, the gear stage Gs of the transmission 26 may be the gear stage of the high vehicle speed as compared with when the downshift delay process is not being performed. When a certain torque is output from the engine 22, the torque output to the drive wheel 29a, 29b becomes smaller as the gear stage Gs of the transmission 26 is the high speed (the gear ratio γ corresponding to the gear stage Gs is smaller). Therefore, when the downshift delay processing is performed, the acceleration of the own vehicle is insufficient compared to when the downshift delay processing is not performed, and there is a possibility that the driver feels a feeling of tightness or the like. In view of this, in the present embodiment, when the target torque Te* is requested to be corrected, incremental correction of the target torque Te* of the engine 22 is performed so that at least a part of the shortage of the torque output to the drive wheel 29a, 29b during the downshift delay process is compensated for with respect to the torque output to the drive wheel 29a, 29b during the downshift delay process when the downshift delay process is not performed. Accordingly, it is possible to suppress insufficient acceleration of the own vehicle during the execution of the downshift delay process, and to prevent the driver from feeling a feeling of rattling or the like.

Subsequently, it is determined whether or not the gear stage Gs of the transmission 26 has been changed (S170), and when it is determined that the gear stage Gs of the transmission 26 has not been changed, the process returns to S150. Considering the case where the acceleration demand of the host vehicle is being made, as the case where the gear stage Gs of the transmission 26 is changed, there can be mentioned a case where the accelerator operation amount Acc is increased and the gear stage Gs is downshifted (so-called kickdown) and a case where the vehicle speed V is increased and the gear stage Gs is upshifted.

When it is determined that the gear stage Gs of the transmission 26 has been changed in S170, the downshift delay process is terminated (S190), and this routine is terminated. Accordingly, the shift diagram is changed from the shift diagram for the downshift delay process to the shift diagram in the normal state.

When it is determined in S150 that the acceleration request of the host vehicle has not been made, it is determined whether the acceleration request of the host vehicle has not been made for a predetermined period of time (S180), and when it is determined that the acceleration request of the host vehicle has not yet been made for a predetermined period of time, the process returns to S150.

When it is determined that S180 has not requested acceleration of the host vehicle for a predetermined period, the downshift delay process is terminated (S190), and the routine is terminated. In the present embodiment, the downshift delay processing is terminated before the acceleration request of the host vehicle is made, in consideration of the fact that the overtaking acceleration accompanied by the lane change from the deceleration of the host vehicle is assumed during the traveling of the expressway.

In the vehicle 20 of the present embodiment described above, when the subject vehicle is in the following mode that follows the forward vehicle, the overtaking with respect to the forward vehicle is restricted, and the predetermined conditions of the accelerator off and the brake off are satisfied, the timing of the downshift of the transmission 26 is changed to the low vehicle speed side as compared with the case where the predetermined condition is not satisfied, and specifically, the downshift delay processing is executed in which the transmission line of the transmission 26 is changed to the low vehicle speed side when the accelerator off and the brake off is performed. Accordingly, since the downshift of the transmission 26 can be delayed, a change in the rotational speed of the engine 22 or the torque converter 25 when the downshift of the transmission 26 is performed can be suppressed, and a change in the deceleration acceleration (deceleration G) of the host vehicle can be suppressed. As a result, deterioration in drivability can be suppressed.

Further, in the vehicle 20 according to the present embodiment, when the forward vehicle is disengaged and the vehicle is requested to accelerate during the downshift delay process, the target torque Te* of the engine 22 is incrementally corrected so that at least a part of the shortage of the torque output to the drive wheel 29a, 29b during the downshift delay process is compensated for with respect to the torque output to the drive wheel 29a, 29b when the downshift delay process is not performed, and the engine 22 is controlled. Accordingly, it is possible to suppress insufficient acceleration of the own vehicle during the execution of the downshift delay process, and to prevent the driver from feeling a feeling of rattling or the like.

In the above-described embodiment, as the downshift delay process, the transmission line of the transmission 26 at the time of the accelerator-off state and the brake-off state is changed to the low-vehicle speed side. Alternatively or additionally, however, the downshift of the transmission 26 may be delayed until the rotational speed Ne of the engine 22 reaches a threshold Neref or less. The threshold Neref is defined as a relatively lower rotational speed within a range in which noise, oscillation, and engine stall of the engine 22 can be suppressed.

In the above-described embodiment, the engine 22 is controlled by increasing and correcting the target torque Te* of the engine 22 so that at least a part of the shortage of the torque output to the drive wheel 29a, 29b during the downshift delay process is compensated for the torque output to the drive wheel 29a, 29b when the downshift delay process is not performed, when the forward vehicle leaves during the downshift delay process and the acceleration request of the own vehicle is performed. However, the target torque Te* of the engine 22 may not be incrementally corrected.

In the above-described embodiment, the downshift delay processing is terminated when the forward vehicle is disengaged during the downshift delay processing, the acceleration request of the host vehicle is made, and the gear stage Gs of the transmission 26 is changed, or the acceleration request of the host vehicle is not made for a predetermined period of time. However, in addition to these, when the brake is turned on, the downshift delay process may be terminated.

In the above-described embodiment, a stepped transmission having a five-stage transmission is used as the transmission 26. However, instead of this, a stepped transmission such as a four-stage shift, a six-stage shift, or a ten-stage shift may be used.

In the above-described embodiment, the engine 22 is used as the drive source. Alternatively or additionally, however, a motor may be used.

The correspondence between the main elements of the embodiments and the main elements of the disclosure described in the column of the means for solving the problem will be described. In the embodiment, the engine 22 corresponds to a "drive source", the transmission 26 corresponds to a "transmission", and the main ECU 50 corresponds to a "control device".

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a vehicle and the like.

What is claimed is:

1. A vehicle comprising:
a drive source;
a transmission that transmits power from the drive source to drive wheels while changing a speed of the power; and
a control device that controls the drive source and the transmission, wherein the control device is configured to execute a downshift delay process of changing a timing of a downshift of the transmission to a low vehicle speed side when a host vehicle is in a following mode in which the host vehicle follows a vehicle ahead, overtaking of the vehicle ahead is restricted, and a predetermined condition that an accelerator is off and a brake is off is met, as compared with when the predetermined condition is not met.

2. The vehicle according to claim 1, wherein the control device is configured to determine that overtaking of the vehicle ahead is restricted when the host vehicle is traveling on a road with one lane in each direction or when a surrounding vehicle is present within a predetermined distance in right and left lanes from the host vehicle.

3. The vehicle according to claim 1, wherein the control device is configured to change a shifting line of the transmission at a time when the accelerator is off and the brake is off to the low vehicle speed side as the downshift delay process.

4. The vehicle according to claim 1, wherein the control device is configured to increase torque of the drive source, when the vehicle ahead has broken away and a request to accelerate the host vehicle has been made during execution of the downshift delay process, so as to compensate for at least a part of a shortage of torque output to the drive wheels when the downshift delay process is executed with respect to torque output to the drive wheels when the downshift delay process is not executed.

\* \* \* \* \*